(12) United States Patent  
Waquet (10) Patent No.: US 7,679,530 B2
(45) Date of Patent: Mar. 16, 2010

(54) ANTI-COLLISION WARNING SYSTEM FOR MARINE VEHICLE AND ANTI-COLLISION ANALYSIS METHOD

(75) Inventor: Philippe Waquet, Ville d'Avray (FR)

(73) Assignee: Sea On Line, Ville d'Avray (FR)

( * ) Notice: Subject to any disclaimer, the term of this patent is extended or adjusted under 35 U.S.C. 154(b) by 435 days.

(21) Appl. No.: 11/685,788

(22) Filed: Mar. 14, 2007

(65) Prior Publication Data

US 2007/0188734 A1     Aug. 16, 2007

Related U.S. Application Data

(63) Continuation of application No. PCT/IB2005/002903, filed on Sep. 29, 2005.

(30) Foreign Application Priority Data

Sep. 29, 2004    (FR)  ................................ 04 52186

(51) Int. Cl.
    *G08B 23/00*     (2006.01)
(52) U.S. Cl. ....................... 340/984; 340/903
(58) Field of Classification Search ................ 340/903, 340/435, 961, 937, 984; 348/148, 149; 701/301
See application file for complete search history.

(56) References Cited

U.S. PATENT DOCUMENTS

| | | | |
|---|---|---|---|
| 3,150,364 A | 9/1964 | Green, V | |
| 3,820,068 A | 6/1974 | McMillin | |
| 3,889,052 A | 6/1975 | Back | |
| 4,290,043 A | 9/1981 | Kaplan | |
| 4,621,266 A | 11/1986 | Le Gall | |
| 4,623,966 A | 11/1986 | O'Sullivan | |
| 5,790,183 A * | 8/1998 | Kerbyson | 348/37 |
| 6,400,830 B1 | 6/2002 | Christian et al. | |
| 2001/0035946 A1 | 11/2001 | Nakase et al. | |
| 2002/0126024 A1 | 9/2002 | Kaplan | |
| 2004/0022416 A1 | 2/2004 | Lemelson | |

(Continued)

FOREIGN PATENT DOCUMENTS

DE     10244641 A1     8/2004

(Continued)

OTHER PUBLICATIONS

John G. Webster (Editor); Wiley Encyclopedia of Electrical and Electronics Engineering; vol. 9 (1999); John Wiley & Sons, Inc.,; pp. 585-586.

(Continued)

*Primary Examiner*—Daniel Wu
*Assistant Examiner*—Shirley Lu
(74) *Attorney, Agent, or Firm*—Panitch Schwarze Belisario & Nadel LLP (57) ABSTRACT

An anti-collision warning system for marine vehicle includes, an optical sensor covering at least partially the horizon of the marine vehicle, image processing means for extracting in real time from each image position information of objects visible on the surface of the sea, and anti-collision analysis means, which periodically calculate the evolution of the position information of each visible object, and which assess a risk of the marine vehicle colliding with each visible object according to the evolution of the position information of the visible object.

22 Claims, 5 Drawing Sheets

U.S. PATENT DOCUMENTS

2004/0183941 A1 9/2004 McKutchen
2004/0189451 A1* 9/2004 Zoratti ................ 340/435

FOREIGN PATENT DOCUMENTS

| EP | 0473468 A1 | 3/1992 |
| EP | 1424567 A1 | 6/2004 |
| GB | 785340 | 10/1957 |
| WO | 83/01681 A1 | 5/1983 |
| WO | 98/05002 A1 | 2/1998 |
| WO | 99/00982 A1 | 1/1999 |

OTHER PUBLICATIONS

"IRSTs See Their Second Coming", Jane's Navy International. Dec. 1996, pp. 26-28.

"Using Adaptive Tracking to Classify and Monitor Activities in a Site", W. E. L. Grimson et al, Computer Vision and Pattern Recognition, 1998, IEEE Proceedings 1998. pp. 22-29.

* cited by examiner

ANTI-COLLISION WARNING SYSTEM FOR MARINE VEHICLE AND ANTI-COLLISION ANALYSIS METHOD

CROSS-REFERENCE TO RELATED APPLICATIONS

This application is a Continuation of International Application No. PCT/IB2005/002903, filed Sep. 29, 2005, which was published in the French language on Apr. 6, 2006, under International Publication No. WO 2006/035305 A2 and the disclosure of which is incorporated herein by reference.

BACKGROUND OF THE INVENTION

Embodiments to the present invention relate to an anti-collision warning system for marine vehicle and to an anti-collision analysis method by processing images coming from an omnidirectional optical sensor installed on board a marine vehicle. More particular, embodiments of the present invention apply mainly, but not exclusively, to ships and to naval drones.

In the rest of the description, the marine vehicle considered as an example is a ship.

The risk of collision which is poorly controlled at sea, comes mainly from an insufficiency of the look-out means. In the field of maritime transport, there are 600 collisions a year on average. The consequences of these collisions are often serious for the environment when they involve oil tankers or chemical tankers.

In the field of maritime passenger transport, the ships (ferries, roll on/roll off ships, etc.) are highly vulnerable.

In the field of fishery, there are some 3,000 collisions a year. The number of victims is high due to the small dimensions of the ships.

In the field of yachting, collisions are also quite frequent.

Collisions at sea mainly result from a lack of look-out. A human failure is at the origin of 70 to 90% of accidents, either by insufficient vigilance, or negligence of the officers of watch, or by routine and poor assessment of the risk. The lack of vigilance is often noticed when the ship is in a "priority" situation, in conditions of good visibility. Accidents can also result from a lack of qualification, an ignorance of rules, or even from a total incompetence of the officers of watch. It is also frequent for the number of officers of watch to be insufficient due to a reduction in the crew (maneuvers, maintenance, commercial activity, etc.), resulting in the officers of watch being overworked and overly tired. These accidents can also result from poor use of the radar system.

At present, most commercial ships have a radar system as anti-collision equipment. This system supplies accurate and reliable information, but requires a setting procedure to be rigorously applied in order to be efficiently usable as an anti-collision system. Now, this procedure is often poorly applied.

There are also ARPA-type systems ("Automatic Radar Plotting Aid") which analyze the signals supplied by a radar. These systems have a high rate of false alarms. The result is that the alarm device associated with the system is often stopped.

An Automatic Identification System (AIS) has also been developed that must equip all high-risk ships (passenger transport, carriage of dangerous goods) from 2010 onwards. This system proves to be very efficient when it is associated with an accurate positioning system such as a GPS (Global Positioning System). However, the AIS does not take into account the traffic of ships that are not equipped with this system and that are much greater in number.

Today, only radar is really taken into account to deal with the risk of collision which lacks redundancy. It is desirable to provide an anti-collision warning system for marine applications having redundancy.

BRIEF SUMMARY OF THE INVENTION

Embodiments of the present invention provide an entirely automated anti-collision warning system and an anti-collision analysis method.

Embodiments of the present invention relate to an anti-collision warning system installed on board a marine vehicle. The anti-collision warning system includes at least one optical sensor covering at least partially the horizon of the marine vehicle, an image processing control that extracts in real time from images supplied by the optical sensor position information of at least one object visible on the surface of the sea, and anti-collision analysis control that, periodically calculates the evolution of the position information of the visible object, and which assesses a risk of the marine vehicle colliding with the visible object according to the evolution of the position information of the visible object.

According to one embodiment of the present invention, the optical sensor comprises at least one video camera fixed in relation to the marine vehicle and covers at least a substantial portion of the horizon continuously.

According to one embodiment of the present invention, the optical sensor comprises at least one video camera the optical field of which can be oriented to cover the horizon by rotation.

According to one embodiment of the present invention, the optical sensor comprises a video camera comprising a lens having an optical axis oriented substantially vertically, a rotating assembly driven by a motor and bearing a mirror arranged in the optical field of the lens and oriented substantially at 45° in relation to the optical axis of the lens, and a device for measuring the angular position of the rotating assembly.

According to one embodiment of the present invention, the system includes a housing made up of a base used as a stand, and a stabilized tank mounted onto a stabilization device and used as a stand for the optical sensor.

According to one embodiment of the present invention, the stabilization device comprises a gimbal and a gyro wheel.

According to one embodiment of the present invention, the sensor comprises a single-line video camera rotatably-driven around a vertical axis.

According to one embodiment of the present invention, the system includes a housing, a rotating assembly held in the housing and driven by a vertical axis motor, a protection cover for protecting the rotating assembly having an opening, a digital video camera fixed onto the rotating assembly, and comprising a single-line detecting element, and a lens the optical axis of which is capable of scanning the horizon by rotation of the rotating assembly.

According to one embodiment of the present invention, the sensor comprises a protective glass ventilated using an exhaust fan to protect the lens.

According to one embodiment of the present invention, image processing integrated circuit cards are fitted into the rotating assembly.

According to one embodiment of the present invention, the system comprises a measuring device for measuring the angular position of the rotating assembly.

According to one embodiment of the present invention, the digital output data of the optical sensor are transmitted through rotating contacts which also ensure the contact of the power supply of the units of the rotating assembly.

According to one embodiment of the present invention, the system comprises an interface to a compass.

According to one embodiment of the present invention, the system comprises an interface to other sensors and analysis control that performs an analysis of consistency with information supplied by the other sensors.

According to one embodiment of the present invention, the system comprises signaling outputs to signal that a dangerous object is detected.

According to one embodiment of the present invention, the position information of each visible object comprises an azimuth and a dimension of the object.

Embodiments of the present invention also relate to an anti-collision warning method in an anti-collision warning system for marine vehicle comprising at least one optical sensor covering at least partially the horizon of the marine vehicle. The method includes extracting in real time from images supplied by the optical sensor position information of at least one object visible on the surface of the sea, periodically calculating the evolution of the position information of the visible object, and assessing a risk of the marine vehicle colliding with the visible object according to the evolution of the position information of the visible object, a visible object being considered dangerous if there is a risk of the marine vehicle colliding with the visible object.

According to one embodiment of the present invention, the method includes displaying information concerning each dangerous object, and of sending a warning signal as soon as a new dangerous object is detected.

According to one embodiment of the present invention, the method includes framing the useful portion of the image supplied by the optical sensor, measuring the average light intensity on at least one portion of the image, comparing each pixel with the average light intensity, and allocating a binary value to each pixel according to the result of the comparison, searching for pixels of a given value forming groups of adjacent pixels, each group of adjacent pixels constituting a visible object, and measuring a position and dimensions of the visible objects, determining dangerous objects according to variations in the position and/or the dimensions of the objects visible in successive images.

According to one embodiment of the present invention, the method includes assessing the afterglow of each group of pixels in successive images, and of determining the groups constituting visible objects according to their afterglow.

According to one embodiment of the present invention, the framing of the useful portion comprises an automatic detection of the sky-line.

According to one embodiment of the present invention, the searching for pixels and determining dangerous objects are performed for each image.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
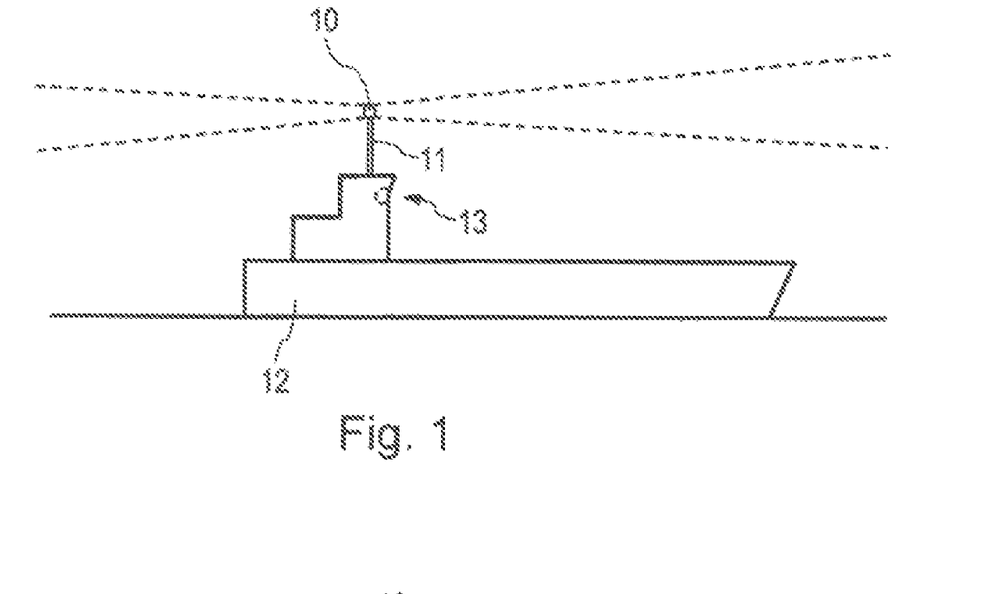
FIG. 1 shows a system of the present invention installed on a ship.

As shown in FIG. 1, a system according to a preferred embodiment of the present invention includes a set of optical sensors 10 disposed in the superstructures of a ship 12, and a computer 13 implanted in the navigation bridge of the ship.

Figure 2:
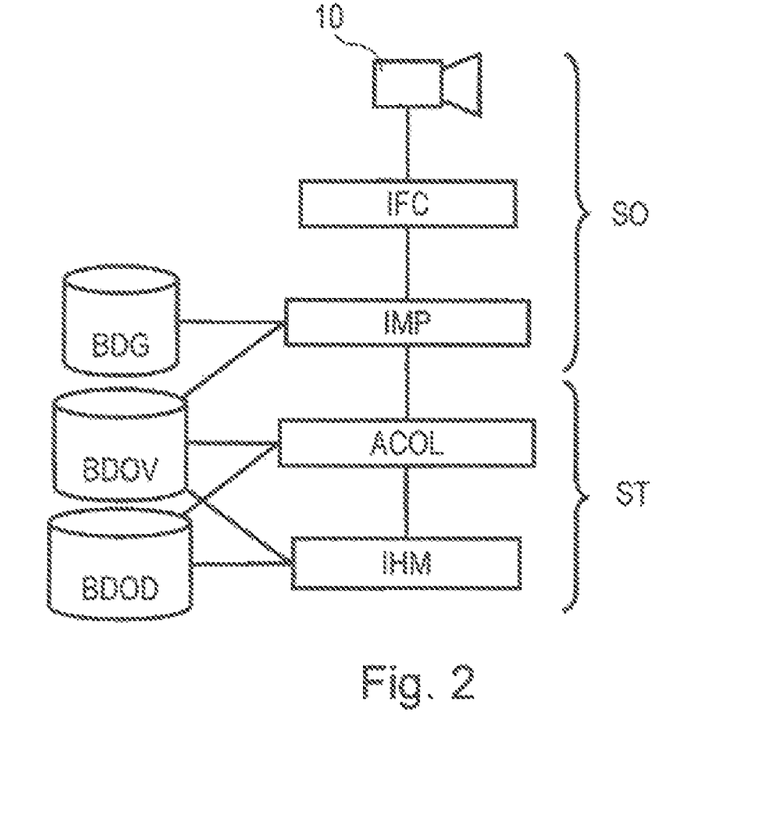
FIG. 2 shows in block form the functions of the system of the present invention.

As shown in FIG. 2, the system includes, from a functional point of view, two segments, i.e., an optical segment SO and a tactical segment ST.

The optical segment includes one or more optical sensors 10 covering at least partially the horizon of the marine vehicle, interface means IFC for interfacing the sensors with the computer, which perform the acquisition of the images supplied by the sensor and the control of the sensors, and image processing means IMP which extract the position information of objects. The tactical segment ST includes anti-collision analysis means ACOL which perform a periodical calculation of the evolution of the position information of each visible object, and assess a risk of the marine vehicle colliding with each visible object, and a man/machine interface IHM, which can be integrated into the controller of the marine vehicle, or remote, and which includes signaling means to signal that a dangerous object is detected.

The set of optical sensors 10 advantageously covers the whole horizon, over 360°, or a significant portion of the latter. Depending on the configuration of the ship, and particularly the dimensions of its superstructures, it can be preferable to have a single sensor or several sensors. Ideally, on a large cargo ship, three sensors, one at the front of the ship and one on either side of the superstructures, enable the entire horizon to be covered, including the nearby areas which are concealed by the superstructures for an observer located on the navigation bridge of the ship.

In a first embodiment of the present invention, each sensor includes a video camera the optical field of which can be oriented to cover the horizon by rotation. In a second embodiment of the present invention, each sensor comprises a single-line video camera that can be oriented, mounted onto a fixed stand. In a third embodiment of the present invention, each sensor comprises one or more video cameras that are fixed in relation to the marine vehicle and covering at least a substantial portion of the horizon continuously.

The best compromise between the resolution of the video camera and the need for stability must be found, given the movements of the carrier ship. Two solutions can be considered:

(i) either mounting the video camera onto a stabilized platform to centre the image on the useful zone around the horizon, or (ii) or using a piece of information about the attitude of the ship (angles of roll and of pitch) to process only the useful portion of the image (points located at a certain distance in pixels above or below the sky-line). This information can either come from an external sensor (attitude control unit), or from image processing (detection of the sky-line) when the horizon is visible.

Figure 3A:
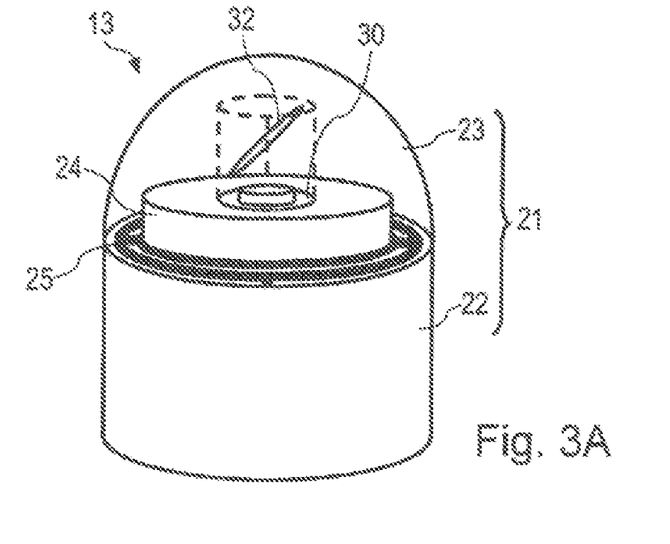
FIG. 3A and 3B show a first embodiment of the system of the present invention.
Figure 3B:
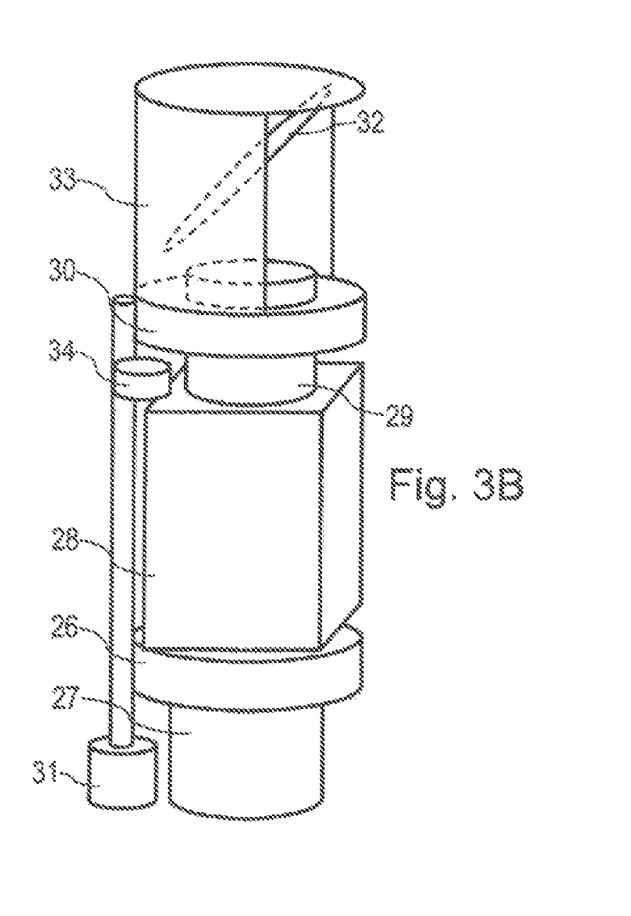

In the first embodiment shown in FIG. 3A and 3B, the optical sensor 10 comprises a video camera the optical field of which can be oriented to cover the horizon by rotation. The video camera is mounted onto a platform stabilized by a gyroscope. The sensor 10 includes a housing 21 made up of a base 22 used as a stand and a transparent dome shield 23, a stabilized tank 24 mounted onto a stabilization device made up of a gimbal 25 and of a gyro wheel 26 driven by an electric motor 27, a video camera 28 fixed onto the stabilized tank and bearing a lens 29 facing the zenith, and a rotating assembly 30 mounted in the stabilized tank driven by a vertical axis rotation motor 31 placed in the bottom of the stabilized tank, and bearing in its upper part a mirror 32 and a sun screen 33. The 45°-orientation of the mirror enables the optical axis of the mirror 32 to scan a horizontal plane by the rotation of the rotating assembly 30, the rays being reflected by the mirror 32 so as to reach the lens of the video camera. The motor 31 drives the rotating assembly through a gear reducer. The sensor 10 also includes a measuring device for measuring the angular position of the rotating assembly, or resolver, 34, possibly integrated into the motor 30 if the technology of the latter so permits (stepping motor).

Depending on the materials used (alloys and/or composites), the whole housing 21 can have a total weight of less than 2 kg and a volume of less than 2 liters.

Prototype tests with a rotation speed of the gyro wheel 26 of 9,900 rpm enabled stability to be ensured characterized by an angular velocity of the tank of less than 60 mrad/s (milliradians per second) in 99% of the cases. The stabilization device provides, with an integration duration of $1/1,000^{th}$ of a second, a "movement" of less than $1/8^{th}$ of a pixel, for a roll/pitch tolerance of the ship of +/−25°. Such a performance can be further improved with a product manufactured industrially (machining operations, adjustments, and tolerance of the bearings) and a rotation speed of the gyro wheel of 15,000 rpm.

The video camera 28 has, for example, the following characteristics:

a 1/3" CCD cell enabling an operation in real time in a standard format (JPEG), an XGA high resolution video format (1,024×768 pixels) offering the best compromise between the angular opening of the lens 29 (36° diagonal) and the angular resolution sought, and a lens 29 with a 9 mm focal length.

Figure 4A:
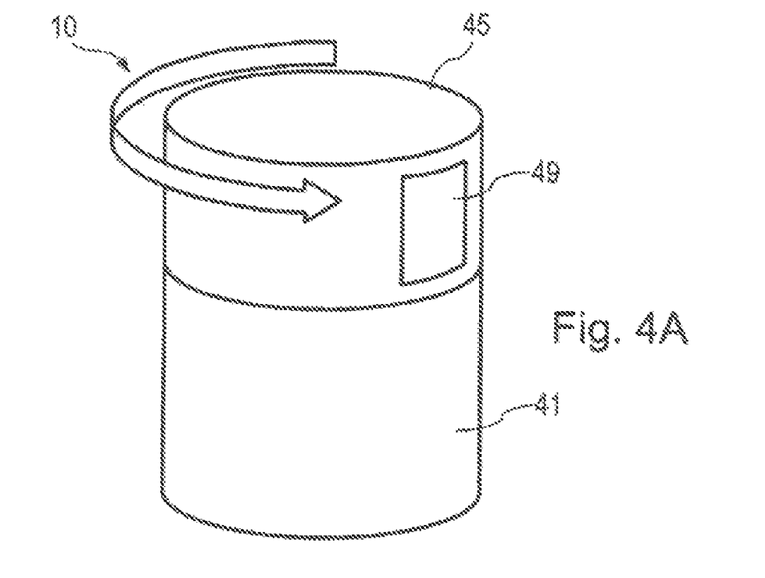
FIG. 4A and 4B show a second embodiment of the system of the present invention.
Figure 4B:
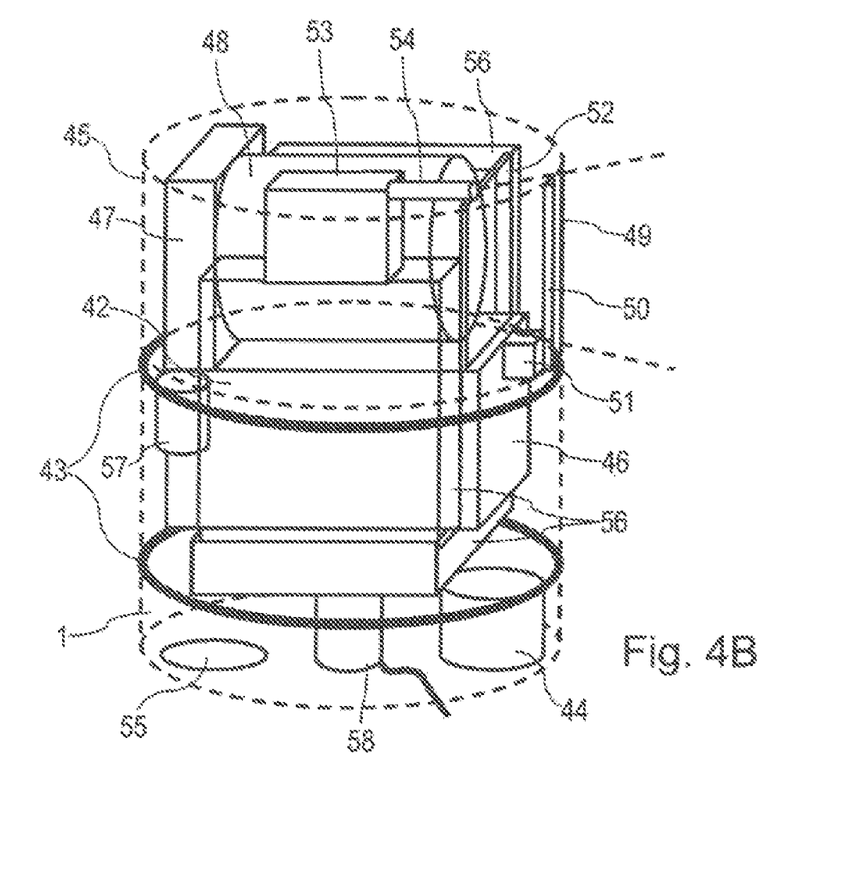

In a second embodiment shown in FIGS. 4A and 4B, the optical sensor 10 comprises a single-line video camera that can be oriented, mounted onto a fixed stand.

More precisely, the optical sensor 10 includes a cylindrical housing 41 fixed onto the masts of the ship, a rotating assembly 42 held in the housing 41 by ball bearings 43 and driven by a vertical axis rotation motor 44 placed at the bottom of the housing, the upper part of the rotating assembly comprising a cylindrical protection cover 45 provided with a rectangular window 49 that enables the optic rays to pass through the cover to reach the lens, and a digital video camera 46 fixed onto the rotating assembly 42 and the single-line detecting element 47 of which is offset above the body of the video camera; the detecting element typically comprises from 512 to 8,192 light-sensitive basic cells disposed in a vertical line. The optical sensor also includes a lens 48, having an angular opening typically of 30 to 55°, disposed in such a way that its optical axis scans the horizon with the rotation of the rotating assembly 42, and a shutter 50 disposed so as to block the rectangular opening 49 when the system is stopped so as to protect the inside of the sensor against spray and rain; the shutter is driven using a magnetic command 51.

When the system is on, the lens 48 is protected against splashes of rain passing through the rectangular opening 49 by a protective glass 52, ventilated using an exhaust fan 53 blowing into a drying nozzle 54 air heated by the different heat sources of the rotating assembly and of the housing (rotation motor, electronics and video camera).

The integrated circuit cards 56 integrating the computer and the associated circuits of the anti-collision warning system are fitted into the rotating assembly 42.

The rotating assembly 42 also bears a bearing coder 57 that measures the angular position of the rotating assembly.

The digital output data of the anti-collision warning system are transmitted through a rotating contactor 58 which also transfers to the computer data coming from the compass of the ship, and ensures the contact of the power supply of the units of the rotating assembly 42.

In the second embodiment, the panoramic image of the sea over 360° around the sensor 10 is produced by scanning the optical slice determined by the rotation of the single-line sensor. The vertical angular opening of this slice is chosen so as to cover the useful orientation range in elevation even with roll/pitch movements.

The angular resolution of the image depends on the horizontal and vertical angular resolutions.

The horizontal angular resolution of the image varies according to the speed of rotation and to the line scanning frequency. The existing linear video cameras have line scanning frequencies typically ranging from about 6 to 87 kHz. In practice, the limit of the scanning frequency depends on the lighting conditions and on the light sensitivity. For a rotation speed typically ranging from 0.12 to 2 revolutions per second, the horizontal resolution is between 0.01 and 2 mrad/pixel (milliradians per pixel).

The vertical angular resolution is determined by the number of pixels of the sensor and the angular opening of the lens. For a number of pixels ranging from 512 to 8,192 and a vertical angular opening between 4 and 45°, the vertical resolution is between 0.01 and 1.5 mrad/pixel.

Figure 5A:
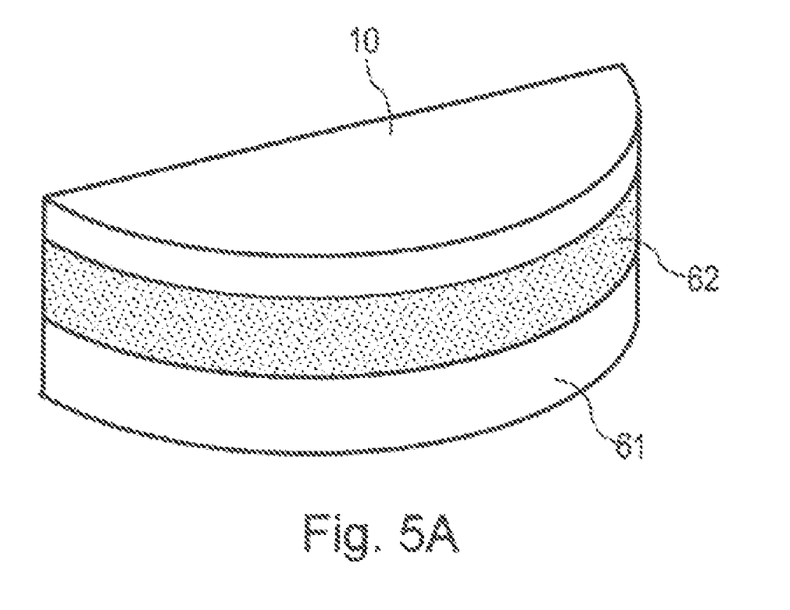
FIG. 5A and 5B show a third embodiment of the system of the present invention.
Figure 5B:
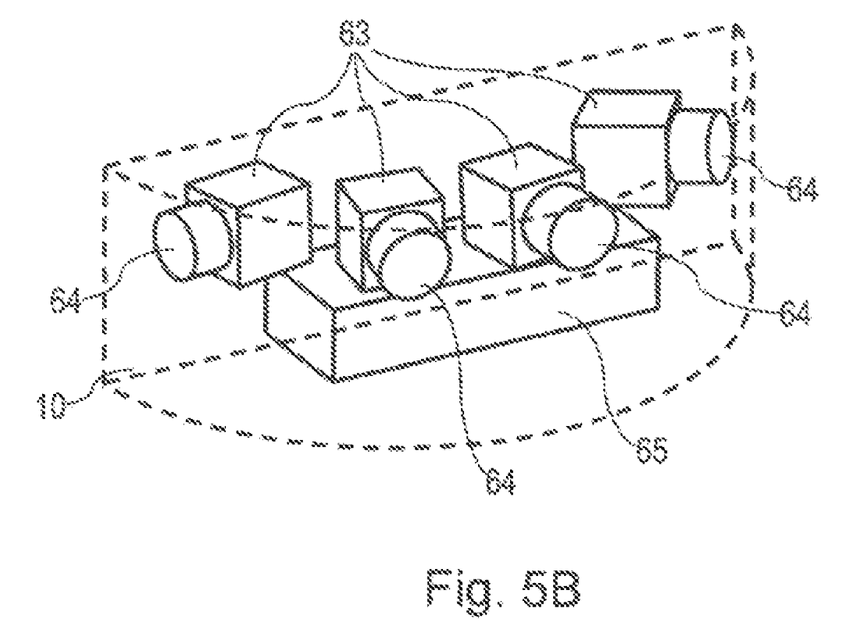

In a third embodiment shown in FIGS. 5A and 5B, the optical sensor 10 comprises a set of fixed video cameras. More precisely, the optical sensor 10 includes a housing 61 fixed onto the superstructure of the ship and comprising a glass opening 62, one or more digital video cameras 63 (typically four) fixed onto the housing 61, and one lens 64 for each video camera 63, the set of lenses being disposed in such a way that the areas they scan cover a substantial portion of the horizon (typically 187°). The optical sensor 10 also includes a connection and multiplexing device 65 enabling the images coming from all the video cameras to be processed simultaneously. This device can integrate an integrated circuit card performing part of the image processing.

In this third embodiment, the resolution of the images is linked to the platform movements of the carrier ship. Typically, on a large ship having a rolling motion limited to +/−10°, using video cameras having a definition of 1,280×1,024 pixels and lenses of 8 to 12 mm enables the resolution necessary to be obtained, in all the lighting conditions, for a detection range up to 10,000 meters.

The interface with the optical sensors (electronic circuit and card, and/or software, and/or wired connections, and/or wireless connections) between the optical sensors and the associated computer, is adapted to the architecture chosen. This interface can include an interface integrated into the computer, an interface integrated into the sensors, and an interface contained in an intermediate case.

The interface with the optical sensors ensures two functions of:

(i) acquiring the images and, in the event that the sensors have a rotating assembly, acquiring the orientation measurement, and (ii) controlling the sensors, i.e. the command of the video cameras and, in the event that the sensors have a rotating assembly, the command of the orientation motors.

In the first embodiment described above and shown in FIGS. 3A and 3B, in which the optical sensor 10 comprises a video camera the optical field of which can be oriented to cover the horizon by rotation, the interface IFC is an electronic circuit integrated into the computer.

In the second embodiment described above and shown in FIGS. 4A and 4B, in which the optical sensor 10 uses a rotating single-line video camera, the interface IFC is a circuit integrated into the integrated circuit cards 56 mounted onto the rotating assembly 42.

In the third embodiment described above and shown in FIGS. 5A and 5B, in which the optical sensor 10 comprises a set of fixed video cameras, the interface IFC is a circuit integrated into the integrated circuit cards of the connection and multiplexing device 65.

The image processing method implemented by the image processing means IMP enables position information of objects visible on the surface of the sea to be extracted in real time from each image supplied by the optical sensor (10), while eliminating the waves and foam.

This image processing includes framing the useful portion of the image supplied by the optical sensor 10, measuring the average light intensity on at least one portion of the image, comparing each pixel with the average light intensity, and allocating a binary value to each pixel depending on whether the difference is above or below a light intensity threshold, searching for pixels of a given value forming groups of adjacent pixels, each group of adjacent pixels constituting a visible object, and measuring a position and dimensions of the visible objects.

The framing of the useful portion can comprise an automatic detection of the sky-line. It can also include a rectification of the image so that the sky-line remains parallel to the bottom edge of the image.

The useful portion of the image can itself be split into several portions, for example according to the distance between each pixel and the sky-line, which roughly determines the distance between the corresponding point and the carrier ship.

The light intensity can be measured, according to the type of video camera used, on the luminance only, and/or on one or more of the three chromatic components (red, blue, yellow).

The comparison of each pixel with the average light intensity can be performed simultaneously using several parameters (threshold, color).

The detection of the visible objects can comprise a step of assessing the afterglow of each group of pixels in successive images. With this aim in view, the position information of all the groups of pixels of each image are saved in a database. The comparison of the successive databases corresponding to the series of images of a same area enables groups constituting visible objects to be determined according to their afterglow, i.e. according to the percentage of appearance of these groups in a certain number of images. This method enables the "non-persistent" objects—waves, reflections, foam—to be removed and only the objects corresponding to ships or objects floating on the surface to be kept.

In the first embodiment in which the optical sensor 10 comprises a video camera the optical field of which can be oriented to cover the horizon by rotation, the image processing is performed on each image, i.e. typically every ¹/₁₅th of a second. This processing includes automatically detecting the sky-line, rectifying the image so that the sky-line remains parallel to the bottom edge of the image, measuring the average light intensity on at least one portion of the image centered on the horizon, comparing each pixel with a light intensity threshold that varies according to the average light intensity, and allocating a binary value to each pixel depending on whether the difference is above or below the light intensity threshold, searching for the pixels of a given value forming groups of adjacent pixels, recording the position information of all the groups of pixels in a database of detected groups BDG, comparing the databases of detected groups constituted successively upon each image supplied by the optical sensor, and determining the groups constituting visible objects according to their afterglow in several databases of detected groups.

In the second embodiment, the image processing by the image processing means IMP is performed first of all on each basic image corresponding to a vertical line, i.e. typically every ¹/₃,₀₀₀th of a second. This processing includes automatically detecting the sky-line, re-adjusting the image so that the sky-line remains at a constant distance, in number of pixels, from the bottom edge of the image, measuring the average light intensity on at least one portion of the image centered on the horizon, comparing each pixel with the average light intensity, and allocating a binary value to each pixel depending on whether the difference is above or below a light intensity threshold, and reconstituting an image formed by the series of the vertical lines.

On each image thus reconstituted, i.e. typically every second, the image processing includes searching for the pixels of a given value forming groups of adjacent pixels, recording the position information of all the groups of pixels in a database of detected groups BDG, comparing the databases of detected groups constituted upon each successive reconstituted image (comparison typically done on 3 to 10 images), and determining the groups constituting visible objects according to their afterglow in several databases of detected groups.

In the third embodiment, the image processing is performed by the image processing means IMP on each image, i.e., typically every second. This processing includes automatically detecting the sky-line, rectifying the image so that the sky-line remains parallel to the bottom edge of the image, measuring the average light intensity on at least one portion of the image centered on the horizon, comparing each pixel with the average light intensity, and allocating a binary value to each pixel depending on whether the difference is above or below a light intensity threshold, searching for the pixels of a given value forming groups of adjacent pixels, recording the position information of all the groups of pixels in a database of detected groups BDG, comparing the databases of detected groups constituted upon each successive image (typically on 3 to 10 images), and determining the groups constituting visible objects according to their afterglow in several databases of detected groups.

The features of the visible objects are stored in a visible objects database BDOV.

Generally, the optical sensor 10 associated with the image processing has the following characteristics.

(i) The optical sensor 10 supplies detection information, i.e., the presence of an object, its azimuth, and in the case of a system with several sensors, the distance of the object.

(ii) The optical sensor 10 enables a detection in the visible, in the same conditions of visibility as the human eye, night and day.

(iii) With appropriate sensors (for example sensitive to infrared), the optical sensor 10 can operate in harsher conditions.

By night, the system can comprise an infrared illumination device, and the distance for detecting dark obstacles can reach up to 2,000 meters.

The optical sensor 10 has a detection distance which can reach, depending on the configuration of the system and the kinematics of the carrying marine vehicle, up to 10,000 meters, while detecting the closest objects.

The optical sensor 10 enables objects not detected by the radar to be located, such as small crafts and flotsams.

The optical sensor 10 image processing can be carried out both in color and in black and white.

The optical sensor 10 can work with the following platform movements: rolling (+/−35°), period of 5 to 15 seconds, pitching (+/−15°), angular velocity less than 10°/sec.

The optical sensor 10 is packaged in a manner adapted to the marine environment in terms of water resistance, mechanical and electrical protection, and sun, spray and vibration resistance.

The anti-collision analysis method implemented by the anti-collision analysis means ACOL includes determining position information of each visible object in the database BDOV, according to their position in the images supplied by the optical sensor, periodically calculating the evolution of the position information of each visible object and assessing the risk of the marine vehicle colliding with each visible object according to the evolution of the position information of the visible object.

The position information of a visible object includes its azimuth, its elevation (angular displacement compared to the sky-line), and possibly its distance when the latter can be calculated (in the case of a system comprising several sensors). This information is completed by an indication of the apparent dimensions of the object in the image: height and/or width in number of pixels.

The principle of analysis of the risk of collision applied by the present invention is based on the evolution of the azimuth of a visible object, and on the evolution of its dimensions and possibly of its distance when the latter is calculated.

More precisely, the anti-collision analysis method includes periodically calculating the evolution of the position and dimension information of each visible object by analyzing the database of the visible objects every 30 seconds, on the basis of a history up to 20 minutes, extracting the objects the azimuth variation of which is lower than 1.5°/min (degrees per minute), extracting the objects the dimension of which increases and/or the distance of which (when it is calculated) decreases, and constituting a database of dangerous objects BDOD containing the features of the visible objects extracted during the previous two steps.

Figure 6A:
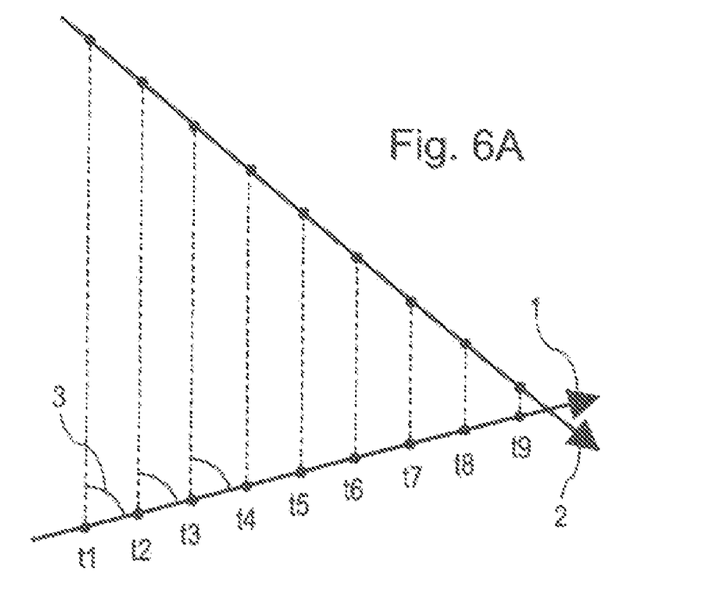
FIG. 6A and 6B show a principle of analysis of the risk of collision applied by the method according to the present invention.
Figure 6B:
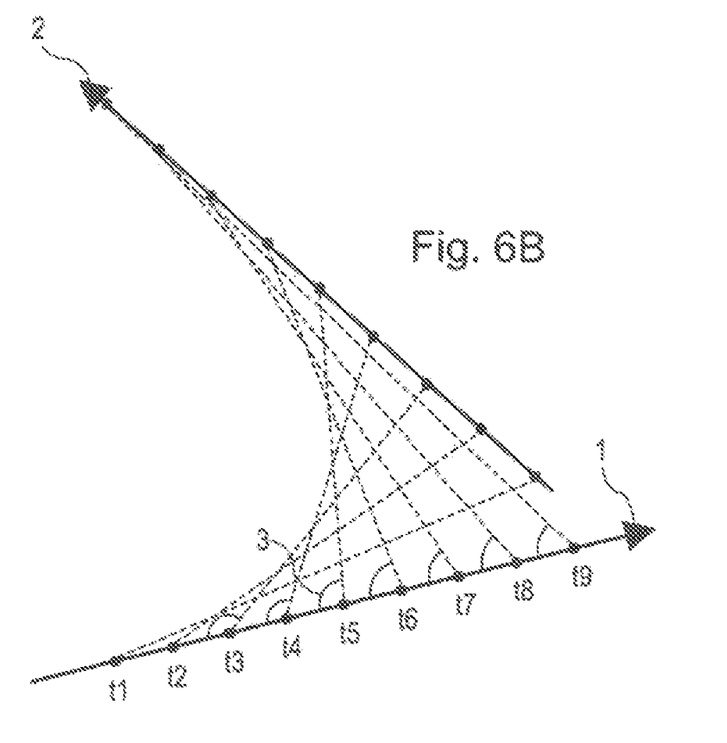

The analysis of the evolution of the azimuth of a visible object can be used as a basis for an assessment of a risk of collision, as shown in FIGS. 6A and 6B. FIGS. 6A-6B represent the trajectory 1 of the ship and the estimated trajectory 2 of a visible object. The points formed on the trajectories 1, 2 show the respective positions of the ship and of the object at instants t1 to t9.

FIG. 6A shows the case of a visible object considered to be dangerous. It can be seen in this figure that the azimuth of the visible object is constant compared to the azimuth of the ship.

FIG. 6B shows the case of a visible object considered non-dangerous. In this case, the azimuth of the visible object compared to the ship is not constant.

The variation in the size of each visible object is also a piece of information to be considered to assess a risk of collision. Indeed, if the ship and the visible object follow parallel trajectories and at the same speed, the azimuth of the object is constant compared to that of the ship although the object does not represent a threat for the ship. In addition, if the apparent size of a visible object increases, this means it is approaching the ship.

If the ship is equipped with an ARPA automaton coupled with a radar system, provision can further be made for acquiring azimuths and radar echo distances taken into account by the "ARPA" automaton and "AIS" tracks. The positions of the radar echoes and AIS tracks can then be compared with the database of the dangerous objects BDOD, to compare each external track with a dangerous object and conversely. The database of the dangerous objects can thus gather all the dangerous objects detected by the system according to the present invention and by the other pieces of equipment of the ship, each dangerous object being associated in the database with a piece of information indicating the one or more means by which each object has been detected.

The databases of visible objects BDOV and of dangerous objects BDOD are ANSI-coded in a frame format compatible with the software commonly used in the data processing systems on board ships, typically the NMEA (National Maritime Electronics Association) format or the XML (eXtended Markup Language) format. The attributes associated with each object in these databases advantageously include:
- the time of the first detection,
- the azimuth,
- the angular width,
- the distance from the ship when it is calculated,
- the accuracy on the distance from the ship,
- the afterglow, and
- the contrast.

The man/machine interface IHM performs the functions of informing the crew and of controlling the system. The function of informing the crew includes sending an alert signal, which can be a sound and/or visual signal and/or adapted to a specific need (for example synthesized voice, or vibration on a body-carried device), as soon as the database of dangerous objects contains a new element, displaying the position information of a dangerous object, and particularly its azimuth, and an indication of the urgent nature of the situation (for example a distance or a time before collision), and recording a history of the databases of the visible objects and dangerous objects.

Provision can also be made for the man/machine interface IHM to offer the possibility of displaying the image of an object in sight in real time, at the operator's request.

When the ship comprises several detection means, the man/machine interface IHM can also display an indication of the one or more means for detecting each object. When the ship is equipped with an ARPA anti-collision device associated with a radar, the man/machine interface advantageously enables the information coming from the databases of visible objects and of dangerous objects to be superimposed in graph form with the ARPA displaying device. If the ship is equipped with a digital mapping device, for example according to the ECDIS (Electronic Chart Display and Information System) standard, the man/machine interface can superimpose in graph form the information coming from the databases of visible objects and of dangerous objects with the ECDIS display.

The function of controlling the system comprises common management commands for managing the operation of the system, and commands enabling the anti-collision system to be maintained.

The common management commands comprise a command for starting and stopping the system, and if any, commands enabling other detection means to be taken into account to be selected.

The commands for maintaining the system comprise commands for starting, stopping and setting each video camera, commands enabling internal adjustments of the computer to be made (thresholds, parameters), and commands for launching automatic procedures for calibrating and internally testing the system.

The man/machine interface IHM is linked at input to the database of visible objects BDOV, and to the database of dangerous objects DBOD. It can be integrated into the controller of the marine vehicle, or remote.

In one embodiment of the system according to the present invention, the man/machine interface IHM is integrated into an external navigation system. The alert, display and control functions enhance the existing interfaces of the external navigation system for the use of ARPA or ECDIS display means.

The ARPA display means display on a monitor a circular zone around the ship. The ARPA view is continuously centered on the ship. The locating is made easier thanks to a radial line set on the North or relative to the axis of the ship, and by a series of distance rings.

The ECDIS display means display on a monitor a rectangular geographical map complying with an international standard. This map is characterized by the geographical position of its centre, its scale, the type of projection (generally speaking Mercator) and its orientation (more often than not to the North or according to the axis of the Ship). The locating on this map is made easier thanks to a grid representing the constant latitudes and longitudes.

These two types of display means display the visible objects and the dangerous objects in the form of specific symbols. Thus, the risk of collision can be assessed visually.

By operator intervention, an image of a visible object can be presented in a window displayed on the monitor. This image is typically refreshed every second to enable a visual assessment in real time of the evolution of a detected ship.

When the system according to the present invention receives information from several sensors, it can also perform for each object a measurement of the angular displacement of the azimuths of the object supplied by the different sensors, as well as a calculation of the distance of the object.

As a result of these provisions, the anti-collision system according to the present invention can offer a certain redundancy with the existing means. Thus, it offers reliable signaling with a relatively low rate of false alarms.

As a result of these features, the system of the present invention can be applied in many fields, and particularly:

in the field of ships commissioned by professionals (trade, fishery, long distance cruising, State-owned ships), in the field of pleasure boats, by its contribution to the safety and comfort of the crew, especially in the absence of radar, in the field of coastal channel fairways (buoys, lighthouses, beacons, jetties, etc.), by monitoring and controlling the traffic and a redundancy of the anti-collision safety in the most dangerous zones, in the field of naval drones, by the possibility of guaranteeing permanent control of anti-collision safety, even when the deployment zone of a drone is not visually controlled by the controller.

In addition, on any marine vehicle, the system of the present invention makes it possible to automatically record all the detections of visible objects, that could enhance the data saved automatically in a "black box" or Voyage Data Recorder VDR.

It will be understood by those skilled in the art that various other alternative embodiments and applications of the system according to the present invention are possible. Thus, the present invention is not limited to a system in which the optical sensor covers the whole horizon of the marine vehicle. The zone monitored by the optical sensor can indeed be limited to a front area of the marine vehicle. It is not essential either for the system to access position information such as the azimuth of the marine vehicle, or information supplied by other systems equipping the marine vehicle. Indeed, the position of the objects detected can be determined in relation to the marine vehicle and to its course. Furthermore, the system according to the present invention may not comprise any man/machine interface, and merely send the information concerning the detection of dangerous objects to another system of the marine vehicle, comprising a man/machine interface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An anti-collision warning system for marine vehicle comprising:
    at least one optical sensor covering at least partially the horizon of the marine vehicle, and supplying images;
    an image processor that searches in real time in each image supplied by the optical sensor for groups of adjacent pixels according to the light intensity of each pixel of the image, that assesses a repeated appearance of each group of pixels in a predetermined number of successive images, that extracts groups constituting persistent objects visible on the surface of the sea, according to their repeated appearances while removing groups constituting non-persistent objects comprising at least one of waves, reflections, and foam, and that determines position and dimension information of at least one of the visible persistent objects; and
    anti-collision analysis control that periodically calculates the evolution of the position and dimension information of the at least one visible persistent object, and that assesses a risk of the marine vehicle colliding with the visible persistent object according to the evolution of the position and dimension information of the visible persistent object.

2. The system according to claim 1, wherein the optical sensor comprises at least one video camera fixed in relation to the marine vehicle and covers at least a substantial portion of the horizon continuously.

3. The system according to claim 1, wherein the optical sensor comprises at least one video camera the optical field of which can be oriented to cover the horizon by rotation.

4. The system according to claim 3, wherein the optical sensor comprises:
    a video camera comprising a lens having an optical axis oriented substantially vertically;
    a rotating assembly driven by a motor and bearing a mirror arranged in the optical field of the lens and oriented substantially at 45° in relation to the optical axis of the lens; and a device that measures the angular position of the rotating assembly.

5. The system according to claim 1, further comprising:
a housing made up of a base used as a stand; and
a stabilized tank mounted onto a stabilization device, and used as a stand for the optical sensor.

6. The system according to claim 5, wherein the stabilization device comprises a gimbal and a gyro wheel.

7. The system according to claim 3, wherein the sensor comprises a single-line video camera rotatably-driven around a vertical axis.

8. The system according to claim 7, further comprising:
a housing,
a rotating assembly held in the housing and driven by a vertical axis motor,
a protection cover for protecting the rotating assembly having an opening,
a digital video camera fixed onto the rotating assembly, and comprising a single-line detecting element; and
a lens the optical axis of which is capable of scanning the horizon by rotation of the rotating assembly.

9. The system according to claim 8, wherein the sensor comprises a protective glass ventilated using an exhaust fan to protect the lens.

10. The system according to claim 8, wherein image processing integrated circuit cards are fitted into the rotating assembly.

11. The system according to claim 8, comprising a measuring device that measures the angular position of the rotating assembly.

12. The system according to claim 8, wherein the digital output data of the optical sensor are transmitted through rotating contacts which also ensure the contact of the power supply of the units of the rotating assembly.

13. The system according to claim 1, comprising means for interfacing with a compass.

14. The system according to claim 1, comprising means for interfacing with other sensors and analysis means performing an analysis of consistency with information supplied by the other sensors.

15. The system according to claim 1, comprising a signaling output to signal that a dangerous object is detected.

16. The system according to claim 1, wherein the position information of each visible object comprises an azimuth and a dimension of the object.

17. An anti-collision warning method in an anti-collision warning system for marine vehicle comprising at least one optical sensor covering at least partially the horizon of the marine vehicle, the method comprising:
acquiring from the optical sensor images including a portion of the horizon of the marine vehicle;
searching in real time in each image acquired for groups of adjacent pixels according to the light intensity of each pixel of the image;
assessing a repeated appearance of each group of pixels in a predetermined number of successive images acquired;
extracting groups constituting persistent objects visible on the surface of the sea, according to their repeated appearances while removing groups constituting non-persistent objects comprising at least one of waves, reflections, and foam,
determining position and dimension information of at least one of the visible persistent objects;
periodically calculating the evolution of the position and dimension information of the visible persistent object; and
assessing a risk of the marine vehicle colliding with the visible persistent object according to the evolution of the position and dimension information of the visible persistent object, a visible persistent object being considered dangerous if there is a risk of the marine vehicle colliding with the visible persistent object.

18. The method according to claim 17, further comprising:
displaying information concerning each dangerous object; and
sending a warning signal as soon as a new dangerous object is detected.

19. The method according to claim 17, wherein the search in each image for groups of adjacent pixels comprises:
a) framing the useful portion of the image supplied by the optical sensor;
b) measuring the average light intensity of the pixels on at least the useful portion of the image;
c) comparing each pixel of the useful portion of the image with the average light intensity, and allocating a binary value to the pixel according to the result of the comparison; and
d) searching for pixels of a given binary value forming groups of adjacent pixels.

20. The method according to claim 19, wherein the framing of the useful portion comprises an automatic detection of the sky-line.

21. The method according to claim 17, comprising steps of measuring a position and dimensions of the objects visible in each image, and of determining the dangerous objects according to variations in the position and/or the dimensions of the objects visible in successive images.

22. The method according to claim 17, wherein the determining groups and determining position and dimension information are performed for each image.

* * * * *